(12) United States Patent
Yoshida

(10) Patent No.: US 12,174,305 B2
(45) Date of Patent: Dec. 24, 2024

(54) POSITION MEASUREMENT SYSTEM, POSITIONING CALCULATION APPARATUS, POSITION MEASUREMENT METHOD AND PROGRAM

(71) Applicant: Nippon Telegraph and Telephone Corporation, Tokyo (JP)

(72) Inventor: Seiji Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 386 days.

(21) Appl. No.: 17/760,822

(22) PCT Filed: Sep. 19, 2019

(86) PCT No.: PCT/JP2019/036795
§ 371 (c)(1),
(2) Date: Mar. 16, 2022

(87) PCT Pub. No.: WO2021/053795
PCT Pub. Date: Mar. 25, 2021

(65) Prior Publication Data
US 2022/0342086 A1    Oct. 27, 2022

(51) Int. Cl.
*G01S 19/47* (2010.01)
*G01S 19/45* (2010.01)
(Continued)

(52) U.S. Cl.
CPC .............. *G01S 19/47* (2013.01); *G01S 19/45* (2013.01); *G01S 19/485* (2020.05); *G01S 19/40* (2013.01); *G01S 19/42* (2013.01); *G01S 19/51* (2013.01)

(58) Field of Classification Search
CPC .......... G01S 19/45; G01S 19/51; G01S 19/40; G01S 19/42; G01S 19/47; G01S 19/485; G01S 19/423; G01S 19/425
(Continued)

(56) References Cited

U.S. PATENT DOCUMENTS 9,182,237 B2 * 11/2015 Morin .................... G01S 19/252
10,371,530 B2 * 8/2019 Ramanandan ..... G01C 21/1656
(Continued)

FOREIGN PATENT DOCUMENTS

CN    116539053 A * 8/2023 ............. G01C 21/32
EP    4145180 A1 * 3/2023 ............. G01S 19/22
(Continued)

OTHER PUBLICATIONS

Kumagai, "Recent trends in GPS/IMU," Photogrammetry and Remote Sensing, 2010, 49(5):326-331, 15 pages (with English Translation).

*Primary Examiner* — Chuong P Nguyen
(74) *Attorney, Agent, or Firm* — Fish & Richardson P.C.

(57) ABSTRACT

A position measurement system includes one or more computers each including a memory and a processor configured to measure an absolute position of a mobile object, attach a first time stamp to an absolute position measurement result, and output the absolute position measurement result with the first time stamp; measure a relative displacement of the mobile object, attach a second time stamp to a relative displacement measurement result, and output the relative displacement measurement result with the second time stamp; and execute positioning computation for calculating the absolute position of the mobile object based on the absolute position measurement result with the first time stamp and the relative displacement measurement result with the second time stamp, attach a third time stamp to a positioning computation result, and output the positioning computation result with the third time stamp.

12 Claims, 8 Drawing Sheets

(51) Int. Cl.
  *G01S 19/48* (2010.01)
  *G01S 19/40* (2010.01)
  *G01S 19/42* (2010.01)
  *G01S 19/51* (2010.01)
(58) Field of Classification Search
  USPC ............. 342/357.25, 357.23, 357.28, 357.34
  See application file for complete search history.

(56) References Cited

U.S. PATENT DOCUMENTS

| | | | |
|---|---|---|---|
| 10,705,542 B1 * | 7/2020 | Kimchi | ................ G08G 5/0069 |
| 2004/0203904 A1 | 10/2004 | Gwon et al. | |
| 2008/0284645 A1 * | 11/2008 | Terada | .................... G01S 19/51 |
| | | | 342/357.41 |
| 2010/0073229 A1 | 3/2010 | Pattabiraman et al. | |
| 2015/0219767 A1 * | 8/2015 | Humphreys | .......... G01S 19/485 |
| | | | 342/357.26 |
| 2015/0268047 A1 | 9/2015 | Morin et al. | |
| 2016/0313450 A1 | 10/2016 | Jordan et al. | |
| 2017/0031032 A1 | 2/2017 | Garin et al. | |
| 2022/0276395 A1 * | 9/2022 | Yoshida | ................. G01S 19/22 |
| 2023/0136186 A1 * | 5/2023 | Yoshida | ................ G01S 19/426 |
| | | | 342/450 |
| 2024/0212362 A1 * | 6/2024 | Kim | ....................... G06V 20/58 |

FOREIGN PATENT DOCUMENTS

| | | |
|---|---|---|
| JP | 2004-215258 | 7/2004 |
| JP | 2015-052601 | 3/2015 |
| JP | 2018-520335 | 7/2018 |
| JP | 2018-526626 | 9/2018 |
| WO | WO-2021220416 A1 * 11/2021 | ............. G01S 19/42 |

* cited by examiner

POSITION MEASUREMENT SYSTEM, POSITIONING CALCULATION APPARATUS, POSITION MEASUREMENT METHOD AND PROGRAM

CROSS-REFERENCE TO RELATED APPLICATIONS

This application is a National Stage application under 35 U.S.C. § 371 of International Application No. PCT/JP2019/036795, having an International Filing Date of Sep. 19, 2019, the disclosure of which is considered part of the disclosure of this application, and is incorporated in its entirety into this application.

TECHNICAL FIELD

The present invention relates to a technique for measuring an absolute position of a mobile object such as a traveling vehicle with high accuracy in autonomous vehicles, advanced driver assistance systems (ADAS), and the like.

BACKGROUND ART

In recent years, positioning using a Global Navigation Satellite System (GNSS) has been used in a wide range of applications.

One application that employs positioning using a GNSS is positioning for an autonomous vehicle. A submeter positioning accuracy for absolute positions (an order of several centimeters to several tens of centimeters) is required in an autonomous vehicle in order to allow lane determination.

However, in a case where GNSS positioning is used as absolute position measurement means, a delay (several tens of milliseconds or more) occurring in positioning computation processing makes it difficult to measure an absolute position with high accuracy in a moving direction in real time (current time). For example, in a case where a vehicle travels at a speed of 60 km per hour, the vehicle moves 16 cm per 10 ms.

Furthermore, in a case where GNSS positioning is used as absolute position measurement means, positioning may be temporarily unavailable in an environment in which a GNSS signal cannot be received, such as in a tunnel or under an elevated structure.

CITATION LIST

Non Patent Literature

NPL 1: "Recent trends in GPS/IMU", Hideo Kumagai, *Photogrammetry and Remote Sensing,* 2010, Volume 49, No. 5, pp. 326-331

SUMMARY OF THE INVENTION

Technical Problem

For example, as disclosed in NPL 1, in order to estimate the position of a mobile object, and the like with high accuracy and enable positioning even when positioning using a GNSS signal temporarily is unavailable, a GNSS/IMU (composite inertial measurement unit) that uses both of relative positioning means (an IMU, a vehicle speed pulse, or the like) and absolute positioning means in combination and performs positioning computation such as self-position estimation computation using a Kalman filter is widely used.

In general, relative positioning means such as an IMU or a vehicle speed pulse periodically outputs data of positioning results. However, when positioning computation processing based on Kalman filter computation or the like is performed using measurement results of absolute positioning means and measurement results of one or more relative positioning means in combination, the real-time performance of data may be impaired due to a difference in the cycle of data output between positioning means and standby for data output, which may affect the accuracy of positioning.

Additionally, in recent years, absolute positioning means and relative positioning means have increasingly diversified, and a delay in processing and/or a delay in propagation of data may affect the positioning accuracy in composite positioning in which positioning is performed by combining a plurality of positioning means.

The present invention is contrived in view of the above-described circumstances, and an object of the present invention is to provide a technique making it possible to measure an absolute position at any time with high accuracy in composite positioning in which positioning is performed by combining absolute positioning means and relative positioning means.

Means for Solving the Problem

According to the disclosed technique, a position measurement system includes: an absolute positioning measuring unit configured to measure an absolute position of a mobile object, attach a first time stamp to an absolute position measurement result, and output the absolute position measurement result with the first time stamp;

a relative positioning measuring unit configured to measure a relative displacement of the mobile object, attach a second time stamp to a relative displacement measurement result, and output the relative displacement measurement result with the second time stamp; and a positioning computation unit configured to execute positioning computation for calculating the absolute position of the mobile object based on the absolute position measurement result with the first time stamp and the relative displacement measurement result with the second time stamp, attach a third time stamp to a positioning computation result, and output the positioning computation result with the third time stamp.

Effects of the Invention

According to the disclosed technology, a technique making it possible to measure an absolute position at any time with high accuracy in composite positioning in which positioning is performed by combining absolute positioning means and relative positioning means is provided.

DESCRIPTION OF EMBODIMENTS

Hereinafter, an embodiment of the present invention (the present embodiment) will be described with reference to the drawings. The embodiment to be described below is merely exemplary, and an embodiment to which the present invention is applied is not limited to the following embodiment.

In the following embodiment, a vehicle that travels on a road is exemplified as a mobile object subject to position measurement, but this is an example. The present invention is applicable to any mobile object that is not limited to vehicles that travel on roads.

Apparatus Configuration

Figure 1:
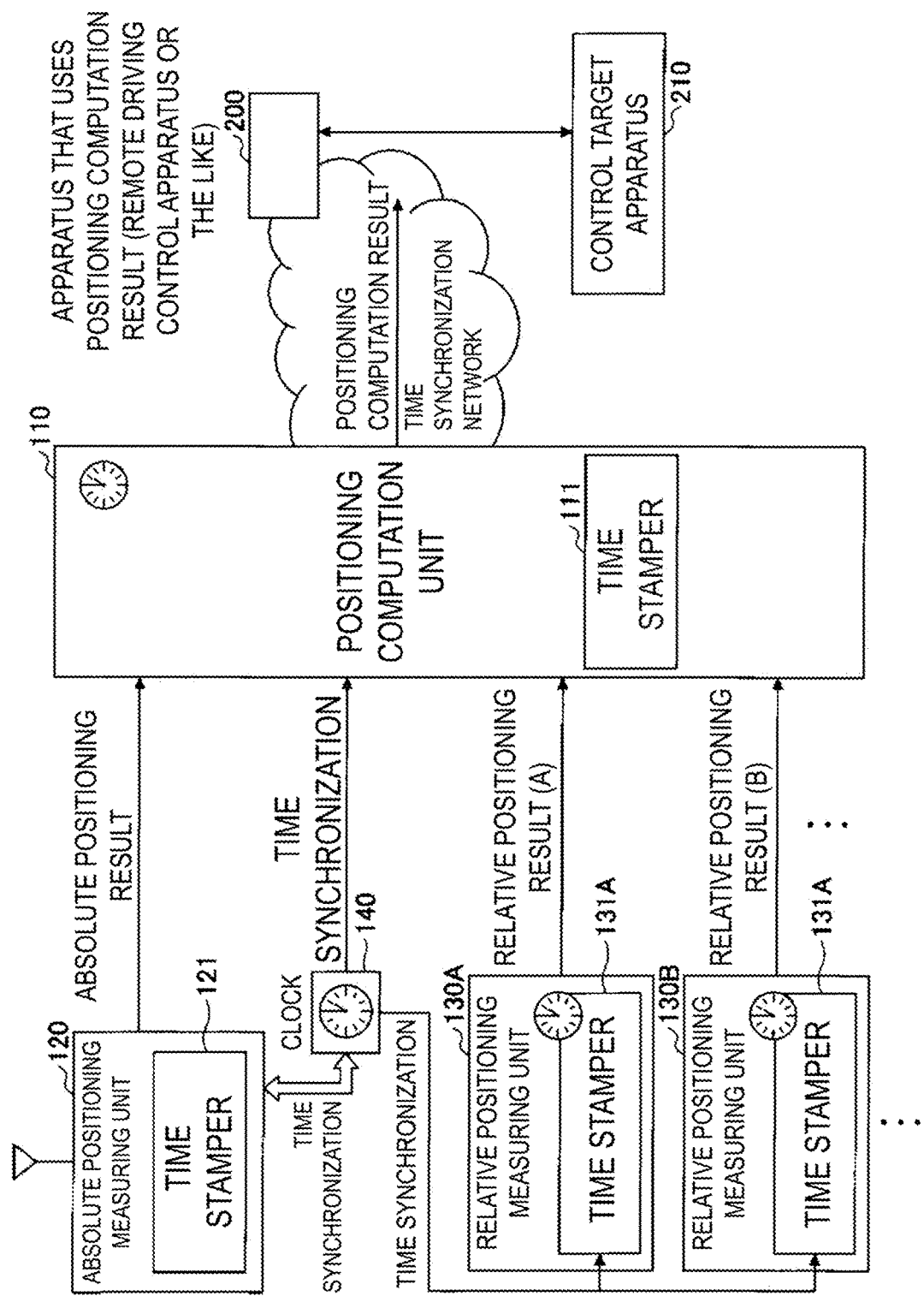
FIG. 1 is a functional configuration diagram of a position measurement system according to an embodiment of the present invention.

FIG. 1 is a functional configuration diagram of a position measurement system 100 in the present embodiment. As illustrated in FIG. 1, the position measurement system 100 according to the present embodiment includes a positioning computation unit 110, an absolute positioning measuring unit 120, a relative positioning measuring unit 130A, a relative positioning measuring unit 130B, and a clock 140. Details of each unit will be described below. Note that the relative positioning measuring unit 130A and the relative positioning measuring unit 130B are collectively referred to as a relative positioning measuring unit 130. In addition, the positioning computation unit 110 may be referred to as a positioning calculation apparatus 110.

Further, in FIG. 1, as an example of an apparatus that uses positioning computation results obtained by the positioning computation unit 110, a remote driving control apparatus 200, and a control target apparatus 210 (autonomous vehicle, or the like) under the remote driving control apparatus 200 are illustrated. The control target apparatus 210 includes, for example, the absolute positioning measuring unit 120, the relative positioning measuring unit 130A, the relative positioning measuring unit 130B, and the clock 140. In addition, the remote driving control apparatus 200 and the control target apparatus 210 may be mounted on the same apparatus (mobile object).

In the example illustrated in FIG. 1, two relative positioning measuring units are provided. However, this is an example, and the number of relative positioning measuring units may be one or may be three or more.

The position measurement system 100 may be one apparatus which is physically integrated, or may be an apparatus in which some functional units are physically separated and the plurality of separate functional units are connected by a network. For example, the positioning computation unit 110 may be a computer operating in accordance with a program, and the other functional units may be configured to be connected to the computer.

Furthermore, the position measurement system 100 may be used such that the entire position measurement system is mounted on a mobile object, or may be used such that part of the entire position measurement system is mounted on a mobile object. For example, the absolute positioning measuring unit 120, the relative positioning measuring units 130A and 130B, and the clock 140 may be mounted on a mobile object, and the positioning computation unit 110 may be provided at a remote location (for example, a data center that implements the cloud, or the like). The control target apparatus 210 may be a mobile object itself.

Further, in a case where the absolute positioning measuring unit 120 is a GNSS receiver, a positioning computation function using a GNSS signal may be provided at a remote location (for example, a data center that implements a cloud, or the like) together with the positioning computation unit 110. In this case, the absolute positioning measuring unit 120 transmits observation data (also referred to as raw data) to the positioning computation function, and the positioning computation function performs positioning computation. The positioning computation unit 110 performs positioning computation using an extended Kalman filter or the like, based on positioning computation results and relative positioning results received from the relative positioning measuring unit 130.

Each unit will be described below.

Absolute Positioning Measuring Unit 120, Clock 140, and Relative Positioning Measuring Unit 130

The absolute positioning measuring unit 120 is a functional unit that measures an absolute position, and is a remote sensing device such as a GNSS receiver, a simultaneous localization and mapping (SLAM), or a LiDAR.

The absolute positioning measuring unit 120 includes a time stamper 121 that stamps a time stamp to a positioning result at a timing when an absolute position measuring result (absolute positioning result) is output (a timing immediately after positioning result data is generated without performing buffering and standby). For example, in a case where the absolute positioning measuring unit 120 is a GNSS receiver, a time obtained by correcting a time included in a navigation message of a navigation satellite signal of a certain time by a propagation delay time elapsed until the navigation satellite signal reaches a receiver, is stamped on a positioning result calculated from the navigation satellite signal. The time stamper 121 has a function of performing time correction or time stamping.

In addition, the absolute positioning measuring unit 120 has a function of synchronizing the clock 140 with absolute time by acquiring highly accurate absolute time information (time information synchronized with coordinated universal time (UTC)) from a GNSS signal received from a positioning satellite and supplying the absolute time information to the clock 140 included in the position measurement system 100.

The clock 140 acquires the above-described absolute time information to operate in synchronization with absolute time. Further, in a case where the absolute positioning measuring unit 120 cannot successfully receive a GNSS signal, that is, even when the absolute positioning measuring unit 120 cannot acquire the absolute time information, the clock 140 has a function of continually outputting highly accurate time for a certain period of time by an operation of calculating time information of the clock based on a clock signal of an oscillator (holdover).

That is, in a case where a mobile object having the absolute positioning measuring unit 120 mounted thereon enters an urban canyon, and a reception environment for a GNSS signal deteriorates, the clock 140 can provide absolute time information with the accuracy of an order of 10 microseconds with respect to the UTC even when a GNSS signal cannot temporarily be received at the time of passing through a tunnel or under an elevated structure, or the like. In addition, a holdover operation can be performed for several tens of minutes under the frequency stability of a crystal oscillator such as TCXO or OCXO included in the clock 140.

The relative positioning measuring unit 130 is a functional unit that measures a relative displacement or the like from a certain position, and is, for example, a vehicle speed pulse measuring device, an acceleration sensor, a gyro, an IMU, an in-vehicle camera, or the like.

In addition, the relative positioning measuring unit 130 includes a time stamper 131 that can stamp a highly accurate time on relative positioning results.

More specifically, the clock 140 and the relative positioning measuring unit 130 (and the time stamper 131) mentioned above are connected to each other by a time synchronization network such as a PTP or a TSN (IEEE802.1 time sensitive network (TSN)), and the clock 140 and the time stamper 131 are time-synchronized. As described above, the clock 140 can supply an accurate absolute time (with an extremely small error), and thus the time stamper 131 time-synchronized with the clock 140 can stamp the accurate absolute time on a positioning result as a time stamp.

In addition, the time stamper 131 stamps a time stamp on a positioning result at a timing when the relative positioning measuring unit 130 outputs a positioning result (a timing immediately after positioning result data is generated without performing buffering and standby).

Note that, in a case where a physical distance between the clock 140 and the relative positioning measuring unit 130 is short such as a case where the clock 140 and the relative positioning measuring unit 130 are present in the same housing, the clock 140 and the relative positioning measuring unit 130 may be connected by means other than a time synchronization network such as a PTP or a TSN (IEEE802.1 time sensitive network (TSN)).

Figure 2:
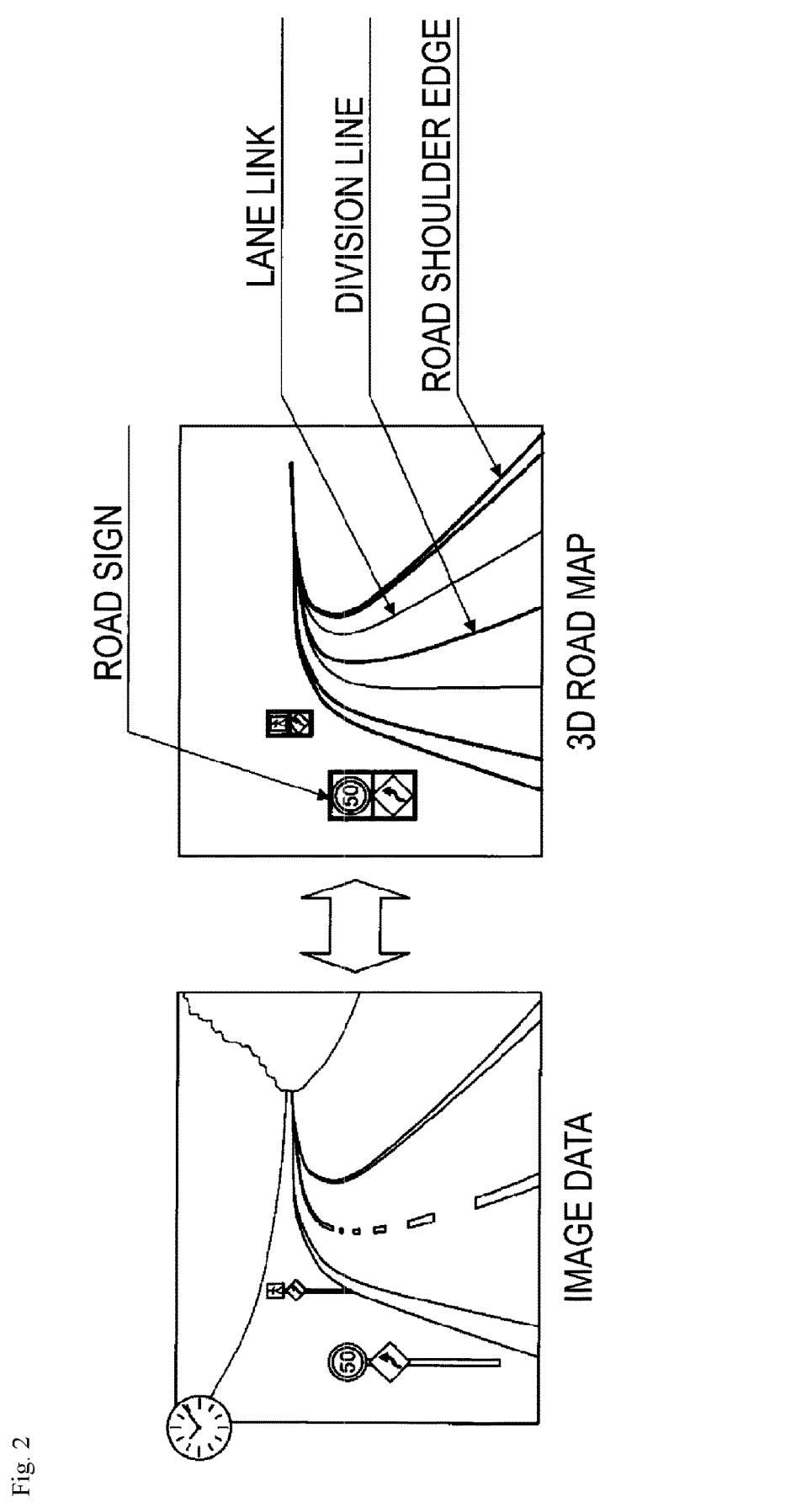
FIG. 2 is a diagram illustrating an example of processing in an absolute positioning measuring unit.

FIG. 2 illustrates an example of positioning in a case where the absolute positioning measuring unit 120 performs positioning using a camera image. As illustrated on the left side in FIG. 2, for example, the absolute positioning measuring unit 120 stamps a time stamp of an absolute time at a point in time of imaging in units of frames on image data captured by a camera mounted on a vehicle. Then, as illustrated on the right side in FIG. 2, the absolute positioning measuring unit 120 matches a 3D road map collected in advance and image data, and calculates its own position. Positional information which is a calculation result is output as an absolute positioning result along with a time stamp.

Figure 3:
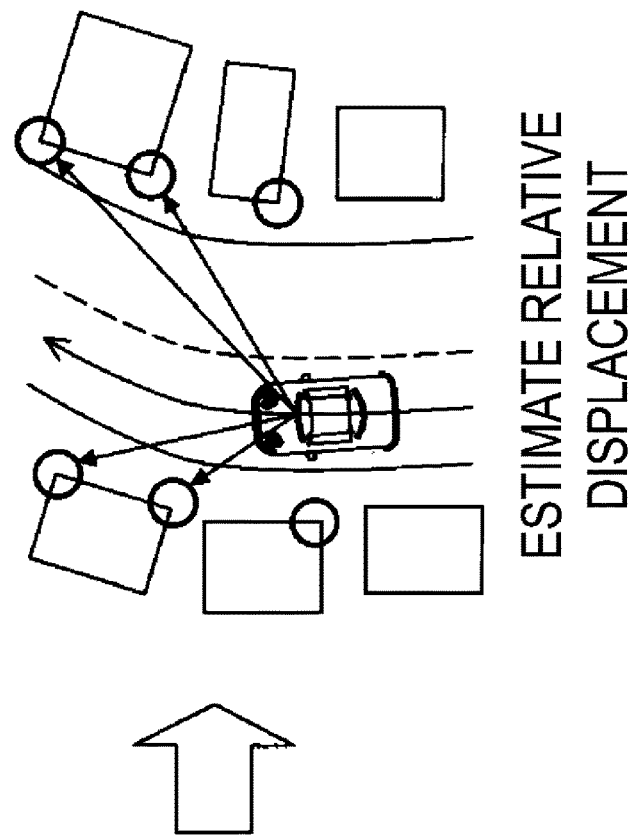
FIG. 3 is a diagram illustrating an example of processing in the relative positioning measuring unit.
Figure 3:
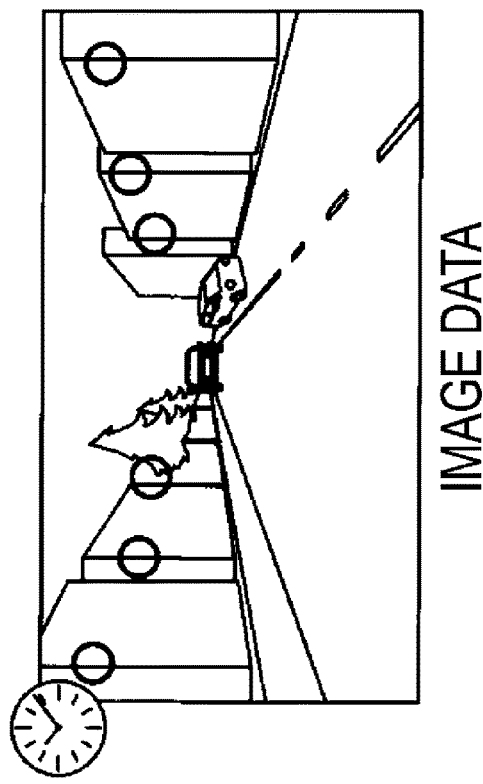

FIG. 3 illustrates an example of positioning in a case where the relative positioning measuring unit 130 performs positioning using a camera image. As illustrated on the left side in FIG. 3, for example, the relative positioning measuring unit 130 stamps a time stamp of an absolute time on image data captured by a camera mounted on a vehicle in units of frames. Then, as illustrated on the right side in FIG. 3, the relative positioning measuring unit 130 extracts characteristic positions such as a building or an edge of a window from image data and calculates a displacement (traveling trajectory) of its own position from variations over time on an image. Displacement information which is a calculation result is output as a relative positioning result along with a time stamp.

A detailed example of operations related to the clock 140 will be described with reference to FIGS. 4 and 5.

Figure 4:
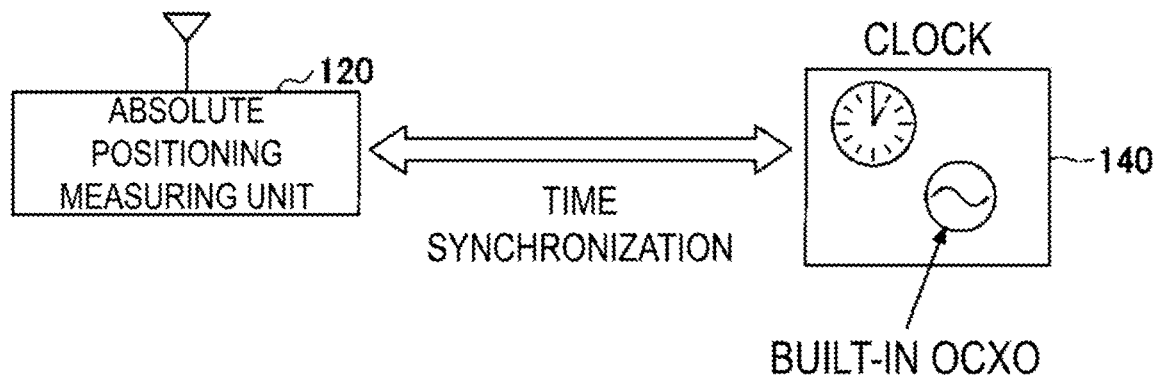
FIG. 4 is a diagram illustrating a method of maintaining the accuracy of time.

FIG. 4 illustrates a case where a GNSS signal is temporarily disconnected when a mobile object equipped with the absolute positioning measuring unit 120 that receives a GNSS signal passes through a tunnel, under an elevated structure, or the like. As described above, even in such a case, the clock 140 can output a highly accurate time for a certain period of time by a holdover operation. For example, in a case where the clock 140 includes a highly accurate oven controlled xtal oscillator (OCXO: a temperature controlled crystal oscillator), it is assumed that the frequency accuracy is 1 ppb ($10^{-9}$), and a necessary time accuracy (a deviation in time) is set to be within 5 microseconds, a holdover time is $5 \times 10^{-6}/10^{-9} = 5 \times 10^3$ (seconds)≈1 hour and 23 minutes.

A GNSS may cause system failures from which recovery takes about a week, and thus it can be expected that such system failures will occur in the future. FIG. 5 illustrates an example of a countermeasure in a case where a long-term system failure of a GNSS occurs.

In the present embodiment, for a long term GNSS system failure, the accuracy of time information is maintained by the clock 140 being network-synchronized with a highly accurate oscillator, such as a cesium or optical lattice clock, which is installed in a network to which the clock 140 is connected.

Figure 5:
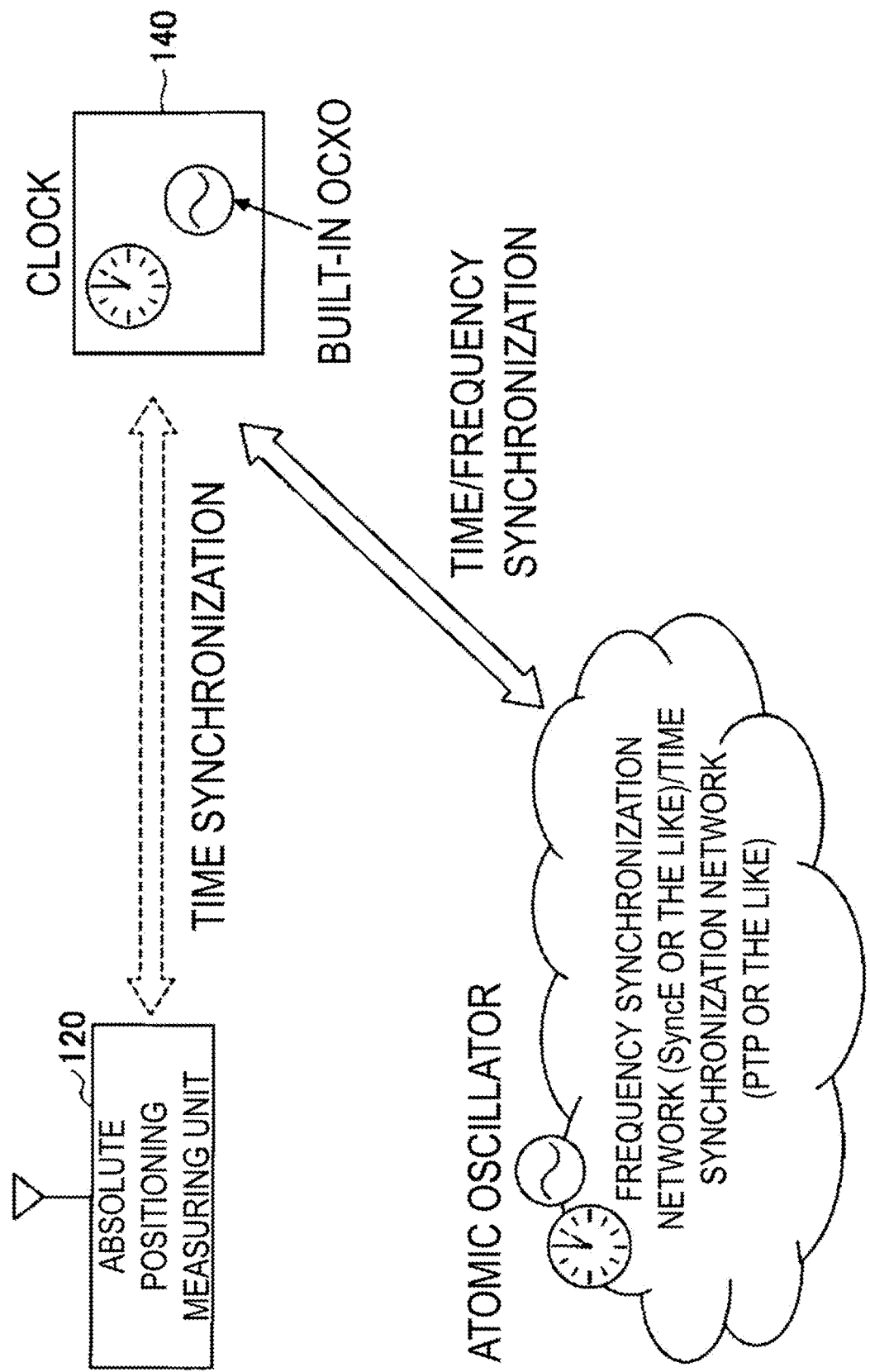
FIG. 5 is a diagram illustrating a method of maintaining the accuracy of time.

In other words, as illustrated in FIG. 5, for example, when the absolute positioning measuring unit 120 detects that a system failure of a GNSS has occurred, switching to network synchronization with a highly accurate cesium atomic oscillator in which the clock 140 is installed in a network may be performed.

In a case where it is assumed that the frequency accuracy of the cesium atomic oscillator is 0.01 ppb ($10^{-11}$), and a necessary time accuracy (a deviation in time) is set to be within 5 microseconds, a holdover time is $5 \times 10^{-6}/10^{-11} = 5 \times 10^5$ (sec)≈139 hours.

Conceivable modes of network synchronization include synchronization based on a frequency synchronization network such as synchronous Ethernet (SyncE) with respect to an intra-network clock source using a highly accurate cesium atomic oscillator, and synchronization based on a time synchronization network such as a precision time protocol (PTP) with respect to a clock in a network operated by a highly accurate cesium atomic oscillator.

Positioning Computation Unit

Next, the positioning computation unit 110 in the position measurement system 100 illustrated in FIG. 1 will be described. The positioning computation unit 110 receives an absolute positioning result acquired by the absolute positioning measuring unit 120 at a certain time (an absolute positioning result with a time stamp at the time), and a relative positioning result acquired by the relative positioning measuring unit 130 at a certain time (a relative positioning result with a time stamp at the time). Then, the positioning computation unit 110 estimates and outputs an absolute position of a mobile object at any time including real time and a future time, using the absolute positioning result and the relative positioning result. For example, an extended Kalman filter is used as a positioning computation function for estimation. In this case, the positioning computation unit 110 includes an extended Kalman filter.

In addition, the positioning computation unit 110 includes a time stamper 111. The positioning computation unit 110 (and the time stamper 111) is time-synchronized with the clock 140 by a PTP, a TSN, or the like. For this reason, the time stamper 111 can stamp a time stamp of an accurate time on a positioning computation result at a timing immediately after the positioning computation result is generated (=a timing at which the positioning computation result is output).

The positioning computation unit 110 can be implemented, for example, by a computer operating in accordance with a program.

Figure 6:
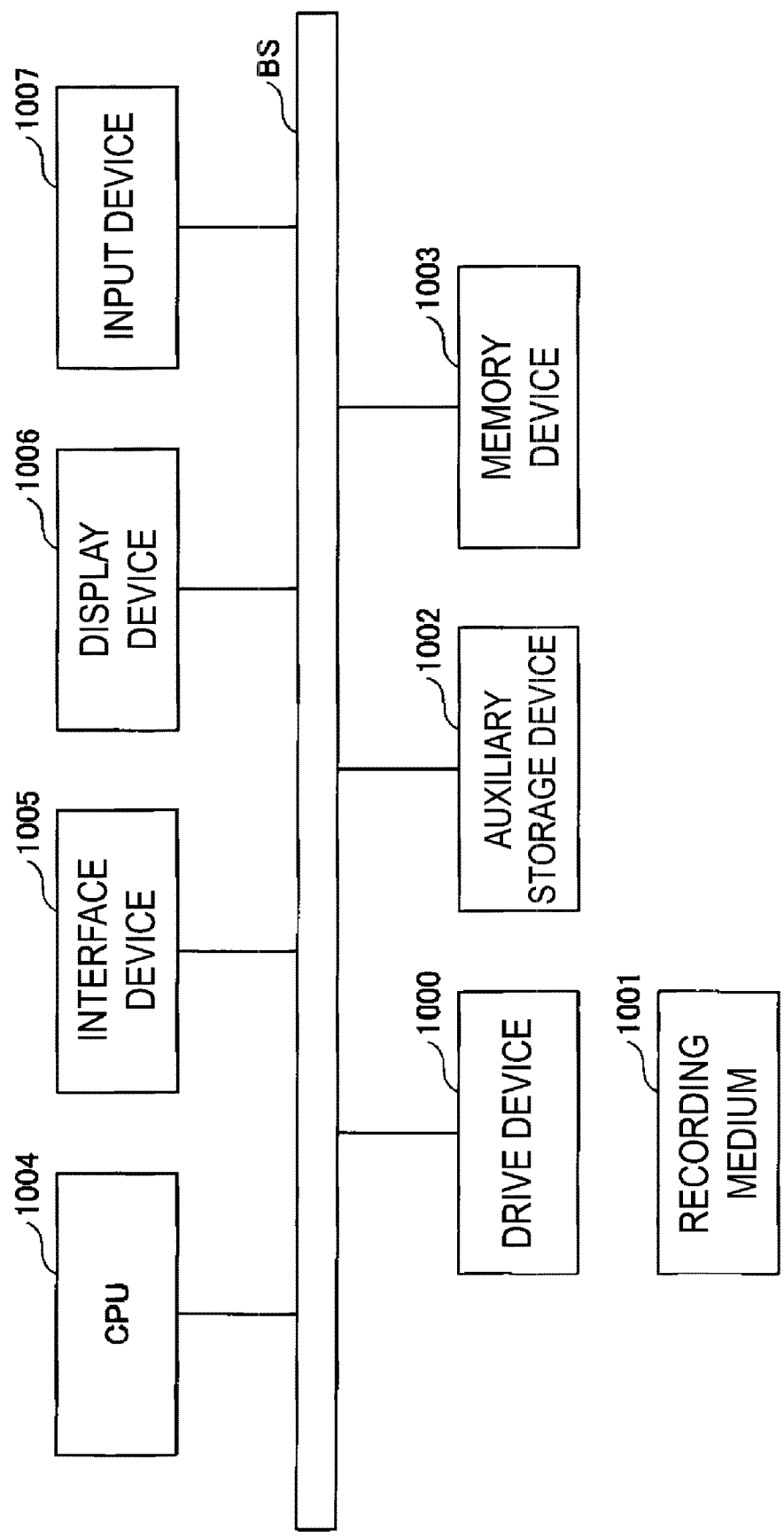
FIG. 6 is a diagram illustrating an example of a hardware configuration of a computer.

FIG. 6 is a diagram illustrating an example of a hardware configuration of the above-described computer in the present embodiment. The computer in FIG. 6 includes a drive device 1000, an auxiliary storage device 1002, a memory device 1003, a CPU 1004, an interface device 1005, a display device 1006, an input device 1007, and the like which are connected to each other through a bus B.

A program for implementing processing in the computer is provided by, for example, a recording medium 1001 such as a CD-ROM or a memory card. When the recording medium 1001 that stores a program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program in a case where an instruction to start the program is given. The CPU 1004 performs functions related to the positioning computation unit 110 and the like in accordance with the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, or the like, and is used to input various operation instructions.

Operation Example

As described above, the positioning computation unit 110 can output a positioning computation result at any time including real time and a future time with a time stamp.

In addition, the positioning computation unit 110 may output a data output time (that is, the value of a time stamp attached to a positioning result) in the positioning measuring unit (the absolute positioning measuring unit 120 or the relative positioning measuring unit 130, or both the absolute positioning measuring unit 120 and the relative positioning measuring unit 130) as information regarding the freshness of a positioning computation result.

In addition, the positioning computation unit 110 may output a delay in processing (including a delay in propagation of a signal), which is a difference between a data output time in the positioning measuring unit (the value of a time stamp attached to a positioning result) and an output time of a positioning computation result (the value of a time stamp attached to a positioning computation result) as information regarding the freshness of a positioning computation result. The positioning measuring unit is the absolute positioning measuring unit 120 or the relative positioning measuring unit 130, or both the absolute positioning measuring unit 120 and the relative positioning measuring unit 130.

In the example illustrated in FIG. 1, the remote driving control apparatus 200, which is an apparatus that uses positioning computation results, is connected to the positioning computation unit 110 via a time synchronization network (for example, a PTP and a TSN). In this case, the remote driving control apparatus 200 can measure a delay time from "the time at which a positioning computation result is output from the positioning computation unit 110" to "the time at which the positioning computation result is received" using a time stamp attached to the positioning computation result. This measurement result is fed back to the positioning computation unit 110, and thus the positioning computation unit 110 can perform "look-ahead" control taking a delay time into consideration.

For example, in consideration of a delay time (hereinafter referred to as Ta) between the time at which the positioning computation result is output in the positioning computation unit 110 and the time at which the positioning computation result is received in the remote driving control apparatus 200 and a signal propagation delay time (hereinafter, Tb) from the remote driving control apparatus 200 to the control target apparatus 210, the positioning computation unit 110 outputs a positioning estimation result at Ta+Tb minutes ahead as a positioning computation result. The remote driving control apparatus 200 that has received the positioning computation result can display a console screen of AR using a dynamic map based on the positioning computation result to perform driving control.

In addition, the remote driving control apparatus 200 can perform control, such as estimation of an error, using the above-described information regarding the freshness. Note that outputting the information regarding the freshness by the positioning computation unit 110 is optional, and the information may not be output.

Figure 7:
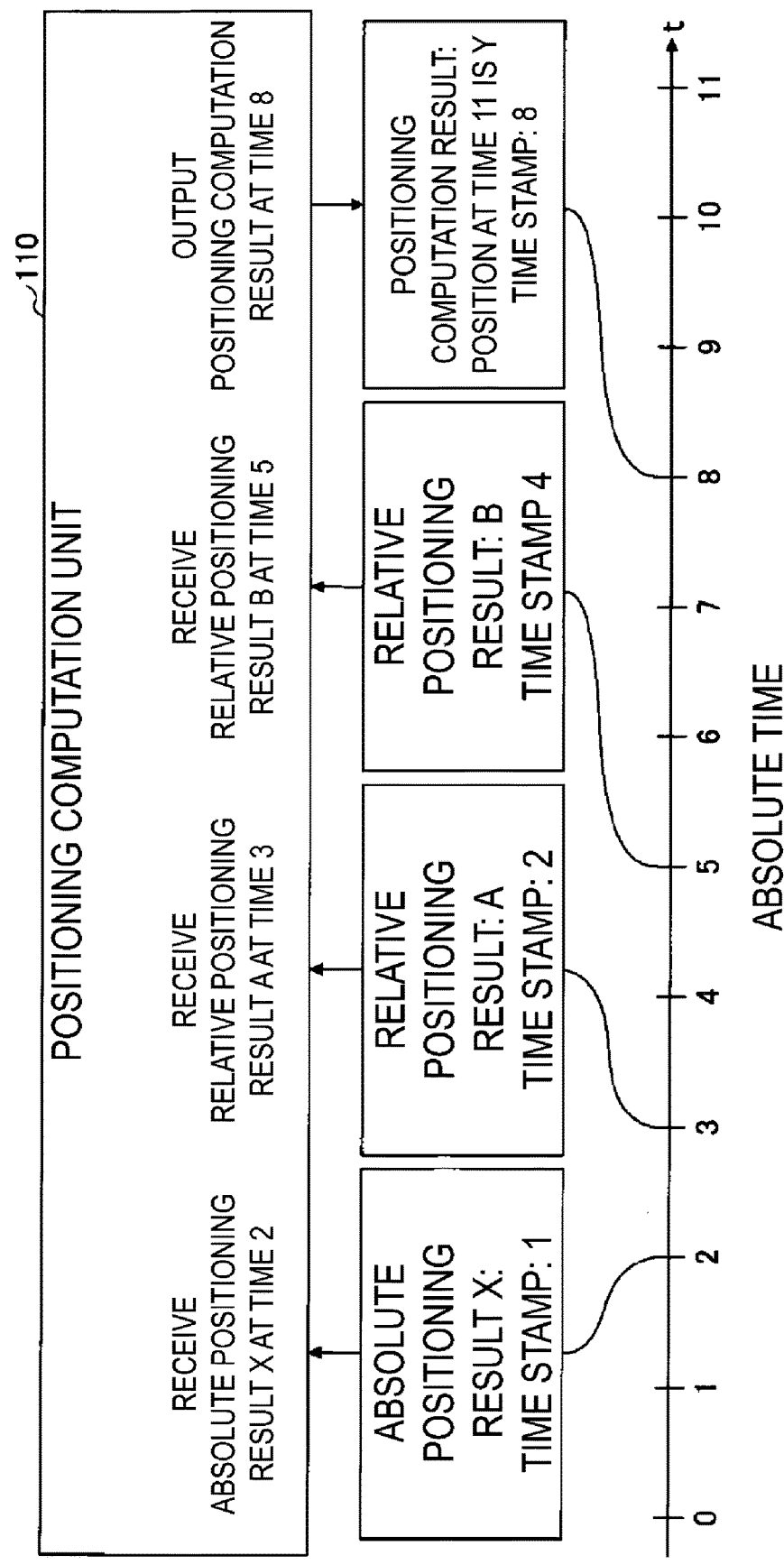
FIG. 7 is a flowchart illustrating operations of the position measurement system.

An operation example of the position measurement system 100 in FIG. 1 will be described with reference to FIG. 7. FIG. 7 illustrates reception and output operations particularly in the positioning computation unit 110.

The absolute positioning measuring unit 120 outputs an absolute positioning result X at time 1, and the positioning computation unit 110 receives the absolute positioning result X (+time stamp: 1) at time 2. This indicates that it took a time of time 1 for a signal to be propagated.

The relative positioning measuring unit 130A outputs a relative positioning result A at time 2, and the positioning computation unit 110 receives the relative positioning result A (+time stamp: 2) at time 3. The relative positioning measuring unit 130B outputs a relative positioning result B at time 4, and the positioning computation unit 110 receives the relative positioning result B (+time stamp: 4) at time 5.

The positioning computation unit 110 performs positioning computation based on received information, and outputs a positioning computation result of "the position at time 11 is Y" (time stamp: 8) at time 8.

For example, the output calculation result reaches the remote driving control apparatus 200 at time 10, is transmitted from the remote driving control apparatus 200 to the control target apparatus 210, and reaches the control target apparatus 210 at time 11. Thereby, the control target apparatus 210 can acquire a real-time estimation position.

As described above, according to the position measurement system 100 of the present embodiment, each of the positioning measuring units attaches a time stamp to a positioning result and outputs the positioning result without a delay. The positioning computation unit 110 performs positioning computation based on the time stamp and a positioning result obtained at the time of the time stamp, and thus it is possible to output a highly accurate positioning computation result even when a delay in processing of data and/or a delay in propagation of a signal occur.

Specific Example of Position Measurement System

Figure 8:
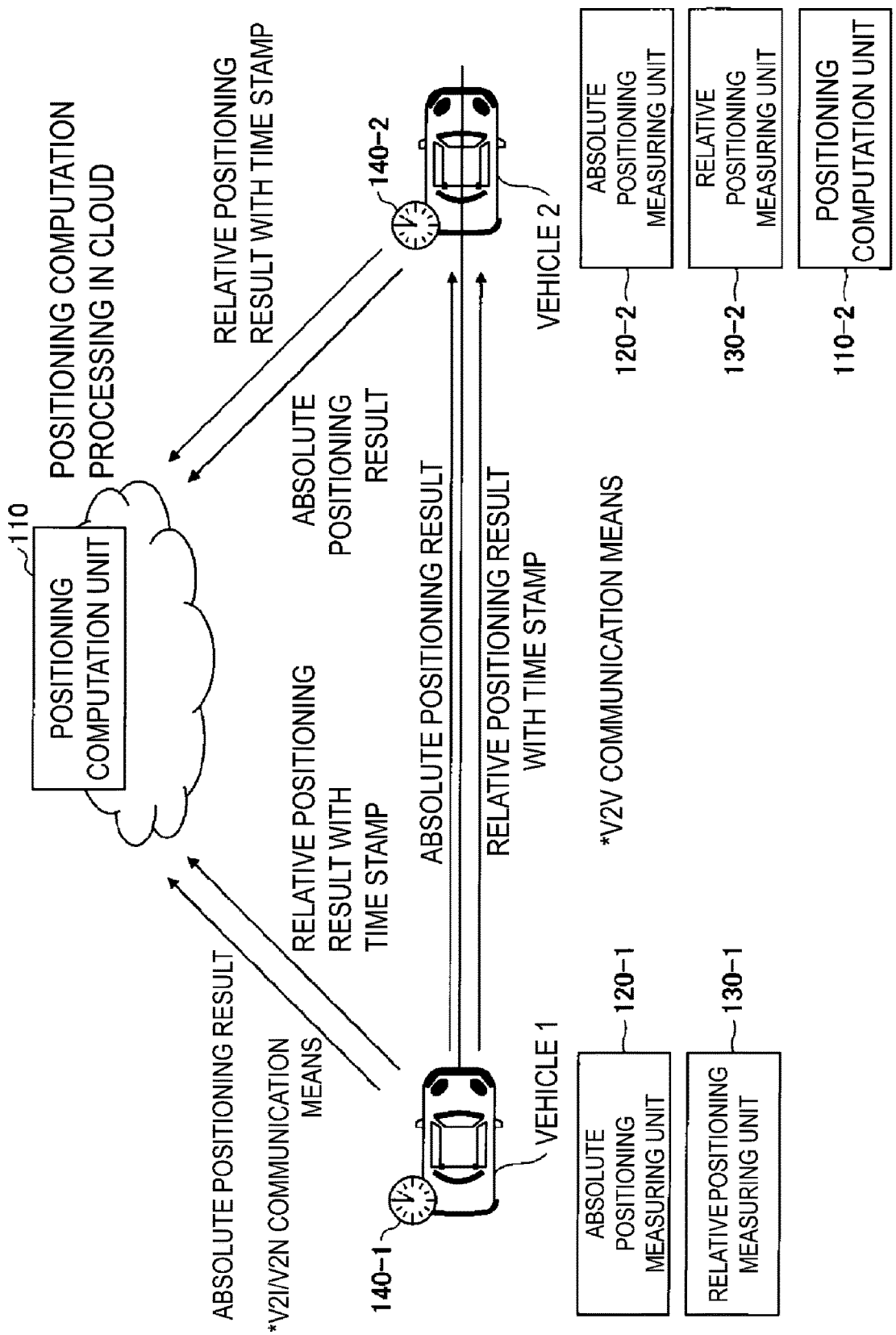
FIG. 8 is a diagram illustrating a specific example of the position measurement system.

FIG. 8 illustrates an example of a case where the position measurement system 100 is used for platooning of autonomous vehicles. In platooning, each vehicle needs to ascertain its own current position and perform driving control so as to maintain a platoon.

In the example of FIG. 8, a vehicle 1 includes a clock 140-1, an absolute positioning measuring unit 120-1, and a relative positioning measuring unit 130-1. A vehicle 2 includes a clock 140-2, an absolute positioning measuring unit 120-2, a relative positioning measuring unit 130-2, and a positioning computation unit 110-2. In addition, the cloud is provided with a positioning computation unit 110.

In the example illustrated in FIG. 8, a case where the vehicle 2, which is a leading vehicle, performs positioning computation processing of the vehicle and performs positioning computation processing of the following vehicle 1 is assumed, and thus the vehicle 2 includes the positioning computation unit 110-2. When such a case is not assumed, the vehicle 2 may not include the positioning computation unit 110-2.

Each vehicle includes V2V communication means, which is vehicle-to-vehicle communication means, and V2I (vehicle-to-infrastructure)/V2N (vehicle-to-network) communication means. By these means, each vehicle can communicate with the other vehicles by a sidelink, and can communicate with the positioning computation unit 110 of the cloud through a 5G network or the like.

As illustrated in FIG. 8, in a case where the vehicle 2 performs positioning computation processing, the absolute positioning measuring unit 120-1 and the relative positioning measuring unit 130-1 of the vehicle 1 transmit respective positioning results (with respective time stamps) to the positioning computation unit 110-2 of the vehicle 2. The positioning computation unit 110-2 performs positioning computation and returns the positioning computation results to, for example, the vehicle 2. At this time, as described with reference to FIG. 7, the vehicle 2 can grasp its own position in real time by performing look-ahead control taking a signal propagation delay and the like into consideration.

Further, in a case where the positioning computation processing is performed in the cloud, the vehicles transmit respective positioning results (with respective time stamps) to the positioning computation unit 110 of the cloud and receive the positioning computation results obtained by the positioning computation unit 110.

In the example illustrated in FIG. 8, the number of vehicles is two, but this is merely an example. The number of vehicles may be two or more. In addition, two or more vehicles may form a platoon of one line or may form a platoon of a plurality of lines (for example, a platoon in which lines of three vehicles are lined up in two lanes (a total of six vehicles)). Further, in a case where any one vehicle in the platoon performs positioning computation, a vehicle performing positioning computation is not limited to a leading vehicle, and any vehicle may perform positioning computation.

The absolute positioning measuring unit mounted on each vehicle constituting the platoon may be different for each vehicle (for example, a GNSS receiver in a certain vehicle, LiDAR in another vehicle, or the like). In addition, the relative positioning measuring unit mounted on each vehicle constituting the platoon may be different from one another (for example, an IMU in a certain vehicle, an in-vehicle camera in another vehicle, or the like).

Effects of Embodiment, and the Like

In the present embodiment, an absolute time (time stamp) is stamped with high accuracy at a timing when pieces of data output from the absolute positioning measuring unit and the relative positioning measuring unit are generated, and thus it is possible to improve the availability of positioning and improve the accuracy of absolute position measurement in real time.

Additionally, in composite positioning using a plurality of positioning measuring units, the influence of a delay in propagation of information can be reduced, and thus a positioning measuring unit and a positioning computation unit can be installed at any locations.

SUMMARY OF EMBODIMENT

In the present embodiment, at least the following position measurement system, position measurement method, and program are provided.

Item 1

A position measurement system including:
an absolute positioning measuring unit configured to measure an absolute position of a mobile object, attach a first time stamp to an absolute position measurement result, and output the absolute position measurement result with the first time stamp;
a relative positioning measuring unit configured to measure a relative displacement of the mobile object, attach a second time stamp to a relative displacement measurement result, and output the relative displacement measurement result with the second time stamp; and
a positioning computation unit configured to execute positioning computation for calculating the absolute position of the mobile object based on the absolute position measurement result with the first time stamp and the relative displacement measurement result with the second time stamp, attach a third time stamp to a positioning computation result, and output the positioning computation result with the third time stamp.

Item 2

The position measurement system according to item 1,
wherein the absolute positioning measuring unit has a function of acquiring an absolute time from a GNSS signal, and the position measurement system includes a clock time-synchronized with the absolute time, and
each of the relative positioning measuring unit and the positioning computation unit is time-synchronized with the clock.

Item 3

The position measurement system according to item 1 or 2,
wherein the positioning computation unit executes positioning computation for calculating the absolute position of the mobile object at a future time based on a delay in propagation of a signal from the positioning computation unit to an apparatus that uses the positioning computation result.

Item 4

The position measurement system according to any one of items 1 to 3,
wherein the positioning computation unit outputs a value of the first time stamp attached to the absolute position measurement result, a value of the second time stamp attached to the relative displacement measurement result, a difference between the value of the first time stamp attached to the absolute position measurement result and the value of the third time stamp attached to the positioning computation result, or a difference between the value of the second time stamp attached to the relative displacement measurement result and the value of the third time stamp attached to the positioning computation result as information regarding a freshness of the positioning computation result.

Item 5

The position measurement system according to any one of items 1 to 4,
wherein the absolute positioning measuring unit and the relative positioning measuring unit are provided in the mobile object, and the positioning computation unit is provided in a cloud connected to the mobile object through a network.

Item 6

The position measurement system according to any one of items 1 to 4,
wherein the absolute positioning measuring unit and the relative positioning measuring unit are provided in the mobile object, and the positioning computation unit is provided in another mobile object that performs side-link communication with the mobile object.

Item 7

A positioning calculation apparatus that executes positioning computation for calculating an absolute position of a mobile object based on an absolute position measurement result with a first time stamp received from an absolute positioning measuring unit that measures the absolute position of the mobile object and a relative displacement measurement result with a second time stamp received from a relative positioning measuring unit that measures a relative displacement of the mobile object, attaches a third time stamp to a positioning computation result, and outputs the positioning computation result with the third time stamp.

Item 8

A position measurement method executed by a position measurement system including an absolute positioning measuring unit, a relative positioning measuring unit, and a positioning computation unit, the method including:
causing the absolute positioning measuring unit to measure an absolute position of a mobile object, attach a first time stamp to an absolute position measurement result, and output the absolute position measurement result with the first time stamp;
causing the relative positioning measuring unit to measure a relative displacement of the mobile object, attach a second time stamp to a relative displacement measurement result, and output the relative displacement measurement result with the second time stamp; and
causing the positioning computation unit to execute positioning computation for calculating the absolute position of the mobile object based on the absolute position measurement result with the first time stamp and the relative displacement measurement result with the second time stamp, attach a third time stamp to a positioning computation result, and output the positioning computation result with the third time stamp.

Item 9

A program causing a computer to function as the positioning computation unit in the position measurement system according to any one of items 1 to 6.

Although the present embodiment has been described above, the present invention is not limited to such a specific embodiment, and various modifications and changes can be made within the scope of the gist of the present invention described in the claims.

REFERENCE SIGNS LIST

100 Position measurement system
110 Positioning computation unit
120 Absolute positioning measuring unit
130 Relative positioning measuring unit
140 Clock
200 Remote driving control apparatus
210 Control target apparatus
1000 Drive device
1002 Auxiliary storage device
1003 Memory device
1004 CPU
1005 Interface device
1006 Display device
1007 Input device

The invention claimed is:

1. A position measurement system comprising:
one or more computers each including a memory and a processor configured to:
measure an absolute position of a mobile object using a global navigation satellite system (GNSS) receiver, a simultaneous localization and mapping (SLAM), or light detection and ranging (LiDAR), attach a first time stamp to an absolute position measurement result, and output the absolute position measurement result with the first time stamp;
measure a relative displacement of the mobile object using a vehicle speed pulse measuring device, an acceleration sensor, a gyro, an inertial measurement unit (IMU), or an in-vehicle camera, attach a second time stamp to a relative displacement measurement result, and output the relative displacement measurement result with the second time stamp; and
execute positioning computation for calculating the absolute position of the mobile object based on the absolute position measurement result with the first time stamp and the relative displacement measurement result with the second time stamp, attach a third time stamp to a positioning computation result, and output the positioning computation result with the third time stamp.

2. The position measurement system according to claim 1, wherein the measurement of the absolute position includes acquiring an absolute time from a GNSS signal, and the position measurement system includes a clock time-synchronized with the absolute time, and
the measurement of the relative displacement and the execution of the positioning computation are time-synchronized with the clock.

3. The position measurement system according to claim 1, wherein the execution of the positioning computation executes positioning computation for calculating the absolute position of the mobile object at a future time based on a delay in propagation of a signal transmitted upon the execution of the positioning computation to an apparatus that uses the positioning computation result.

4. The position measurement system according to claim 1, wherein the execution of the positioning computation outputs a value of the first time stamp attached to the absolute position measurement result, a value of the second time stamp attached to the relative displacement measurement result, a difference between the value of the first time stamp attached to the absolute position measurement result and the value of the third time stamp attached to the positioning computation result, or a difference between the value of the second time stamp attached to the relative displacement measurement result and the value of the third time stamp attached to the positioning computation result as information regarding a freshness of the positioning computation result.

5. The position measurement system according to claim 1, wherein the measurement of the absolute position and the measurement of the relative displacement are executed in the mobile object, and the execution of the positioning computation is executed in a cloud connected to the mobile object through a network.

6. The position measurement system according to claim 1, wherein the measurement of the absolute position and the measurement of the relative displacement are executed in the mobile object, and the execution of the positioning computation is executed in another mobile object that performs sidelink communication with the mobile object.

7. The position measurement system according to claim 1, wherein the positioning computation result is transmitted to a remote driving control apparatus, causing the remote driving control apparatus to display an augmented reality (AR) console screen of using a dynamic map based on the positioning computation result to perform driving control.

8. A non-transitory computer-readable recording medium having computer-readable instructions stored thereon, which when executed, cause a computer including a memory and a processor to execute the positioning computation in the position measurement system according to claim 1.

9. A positioning calculation apparatus that executes positioning computation for calculating an absolute position of a mobile object based on an absolute position measurement result with a first time stamp obtained by measuring the absolute position of the mobile object using a global navigation satellite system (GNSS) receiver, a simultaneous localization and mapping (SLAM), or light detection and ranging (LiDAR) and a relative displacement measurement result with a second time stamp obtained by measuring a relative displacement of the mobile object using a vehicle speed pulse measuring device, an acceleration sensor, a gyro, an inertial measurement unit (IMU), or an in-vehicle camera, attaches a third time stamp to a positioning computation result, and outputs the positioning computation result with the third time stamp.

10. The positioning calculation apparatus according to claim 9,
wherein the positioning computation result is transmitted to a remote driving control apparatus, causing the remote driving control apparatus to display an augmented reality (AR) console screen of using a dynamic map based on the positioning computation result to perform driving control.

11. A position measurement method executed by a position measurement system including one or more computers each including a memory and a processor, the method comprising:
measuring an absolute position of a mobile object using a global navigation satellite system (GNSS) receiver, a simultaneous localization and mapping (SLAM), or light detection and ranging (LiDAR), attaching a first time stamp to an absolute position measurement result, and outputting the absolute position measurement result with the first time stamp;
measuring a relative displacement of the mobile object using a vehicle speed pulse measuring device, an acceleration sensor, a gyro, an inertial measurement unit (IMU), or an in-vehicle camera, attaching a second time stamp to a relative displacement measurement result, and outputting the relative displacement measurement result with the second time stamp; and
executing positioning computation for calculating the absolute position of the mobile object based on the absolute position measurement result with the first time stamp and the relative displacement measurement result with the second time stamp, attaching a third time stamp to a positioning computation result, and outputting the positioning computation result with the third time stamp.

12. The position measurement method according to claim 11,
wherein the positioning computation result is transmitted to a remote driving control apparatus, causing the remote driving control apparatus to display an augmented reality (AR) console screen of using a dynamic map based on the positioning computation result to perform driving control.

* * * * *